United States Patent [19]

Iwata et al.

[11] 4,259,722
[45] Mar. 31, 1981

[54] ELECTRIC CONTROL METHOD AND APPARATUS FOR AUTOMOBILE AIR CONDITIONER

[75] Inventors: Yasuhiro Iwata, Aichi; Kiyoshu Usami, Obu; Masanori Naganoma, Kariya; Teiichi Nabeta, Okazaki; Yasuhumi Kojima, Gifu, all of Japan

[73] Assignee: Nippondenso Co., Ltd., Kariya, Japan

[21] Appl. No.: 82,425

[22] Filed: Oct. 5, 1979

[30] Foreign Application Priority Data

Oct. 11, 1978 [JP] Japan .................................. 53-125431

[51] Int. Cl.³ .......................... G06F 15/20; B60H 3/00
[52] U.S. Cl. ..................................... 364/424; 165/42; 237/5; 364/418
[58] Field of Search ........................ 364/418, 424, 425; 165/41, 42; 237/5, 28, 32

[56] References Cited

U.S. PATENT DOCUMENTS

| | | |
|---|---|---|
| 3,906,207 | 9/1975 | Rivere et al. .......................... 364/425 |
| 3,948,312 | 4/1976 | Nisbet ..................................... 165/42 |
| 3,983,930 | 10/1976 | Franz ..................................... 165/42 |
| 4,123,796 | 10/1978 | Shih ....................................... 364/418 |

Primary Examiner—Errol A. Krass
Attorney, Agent, or Firm—Cushman, Darby & Cushman

[57] ABSTRACT

An electric control method and apparatus for an automobile air conditioner which is capable of conducting recirculation of inside air from a passenger compartment into an air duct under undesired outside air conditions caused by noxious gases, dust and the like and is also capable of conducting induction of outside air into the compartment through the air duct when the undesired outside air conditions are extinguished.

5 Claims, 2 Drawing Figures

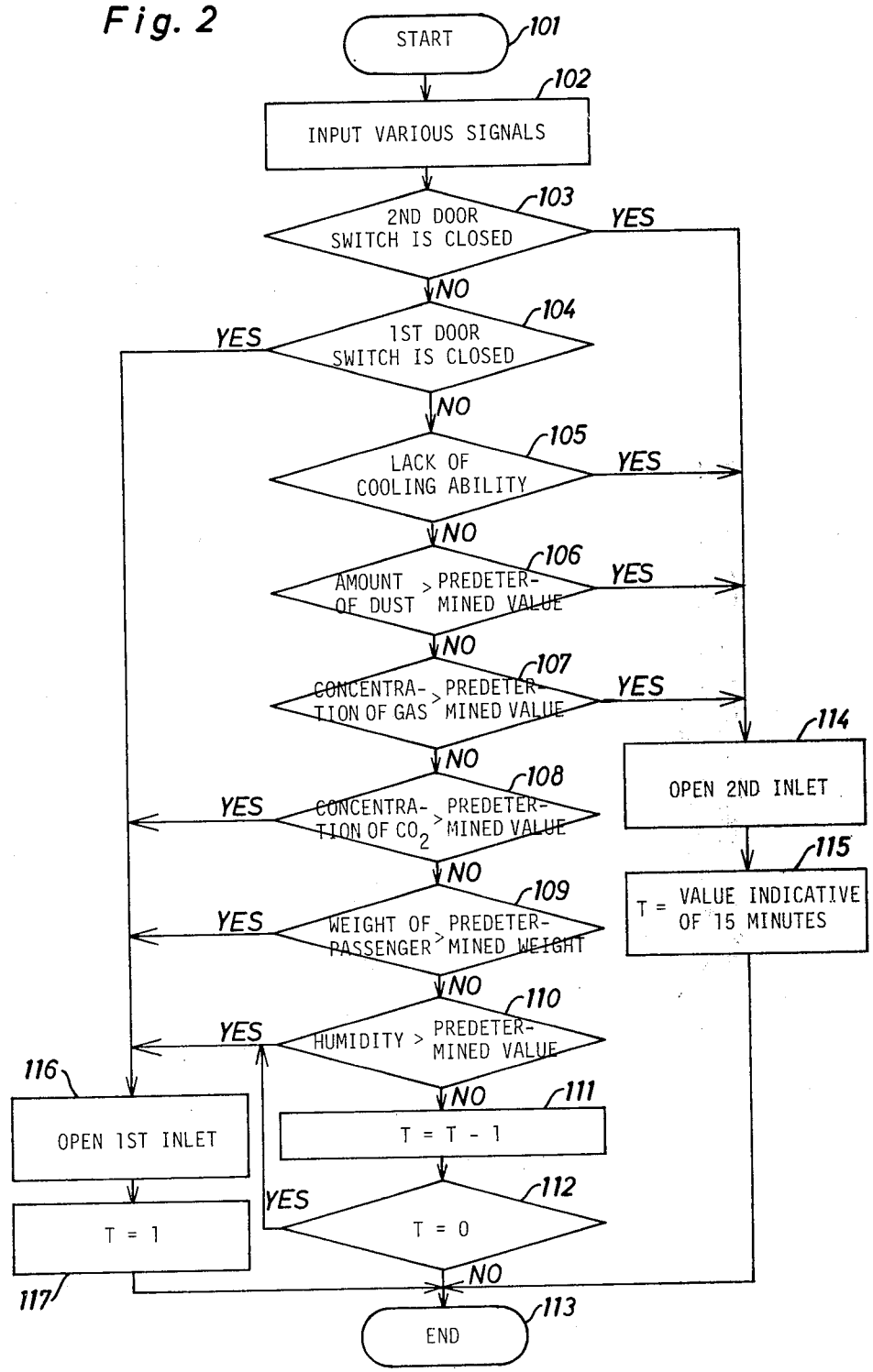

4,259,722

ELECTRIC CONTROL METHOD AND APPARATUS FOR AUTOMOBILE AIR CONDITIONER

BACKGROUND OF THE INVENTION

The present invention relates to automobile air conditioners, and more particularly to an electric control method and apparatus for an automobile air conditioner in which a switch door is arranged to selectively conduct induction of outside air from the exterior into a passenger compartment through an air duct and recirculation of inside air from the compartment into the air duct.

In such an automobile air conditioner of the type as described above, it is desirable that the induction of outside air is controlled in accordance with various air conditions outside and inside of the automobile.

SUMMARY OF THE INVENTION

The primary object of the present invention is to provide an electric control method and apparatus for an automobile air conditioner capable of conducting the recirculation of inside air under undesired outside air conditions caused by noxious gases, dust and the like and conducting the induction of outside air when the undesired outside air conditions are extinguished.

Another object of the present invention is to provide an electric control method and apparatus, having the above-mentioned characteristics, in which the induction of outside air is conducted in accordance with appearance of undesired inside air conditions caused by carbon dioxide, humidity and the like.

According to the present invention, there is provided a method for controlling an automobile air conditioner including an air duct provided with a first inlet for inducting outside air from the exterior into a passenger compartment through the air duct and with a second inlet for recirculating inside air from the passenger compartment into the air duct, a switch door arranged within the air duct for conducting the induction of outside air in its first position and the recirculation of inside air in its second position, and an actuator arranged to switch over the switch door from the first position to the second position in its first operative condition and to switch over the switch door to the first position from the second position in its second operative condition, the method comprising the steps of:

detecting undesired outside air conditions to produce a first electric signal indicative of the undesired outside air conditions;

detecting undesired inside air conditions to produce a second electric signal indicative of the undesired inside air conditions;

discriminating whether or not a value of the first electric signal exceeds a first predetermined value;

generating a first output signal when the value of the first electric signal exceeds the first predetermined value such that the actuator is rendered in response to the first output signal in the first operative condition;

generating a second output signal with lapse of a predetermined period of time after the value of the first electric signal becomes below the first predetermined value such that the actuator is rendered in response to the second output signal in the second operative condition;

discriminating whether or not a value of the second electric signal exceeds a second predetermined value during the predetermined period of time; and conducting the generation of the second output signal when the value of the second electric signal exceeds the second predetermined value during the predetermined period of time.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 2 is a flow diagram illustrating operation of the digital computer shown in block form in FIG. 1.

DESCRIPTION OF THE PREFERRED EMBODIMENT

Figure 1:
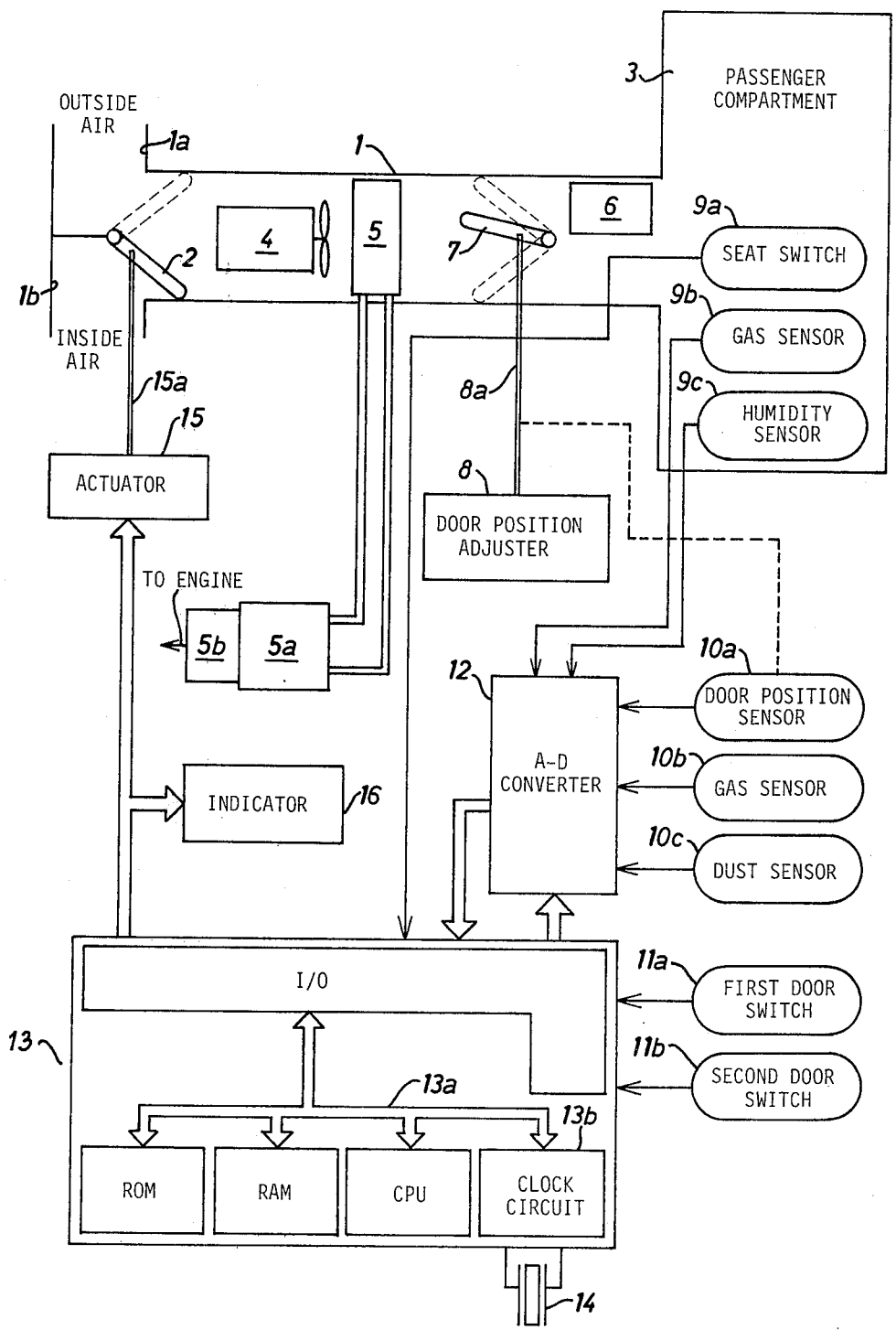
FIG. 1 is a schematic block diagram of an electric control apparatus in accordance with the present invention adapted to an automobile air conditioner.

Referring now to FIG. 1 of the drawings, there is illustrated an electric control apparatus for an automobile air conditioner in accordance with the present invention. In the air conditioner, an air duct 1 is provided therein with a switch door 2 which is coupled by a rod 15a to an actuator 15 in the form of an electrically operated vacuum mechanism having a conventional construction. The actuator 15 is energized by operation of the electric control apparatus, as described below, to receive vacuum pressure from an automobile engine such that the rod 15a is displaced to switch over the switch door 2 from a second position to a first position, the first and second positions of switch door 2 being respectively indicated by solid and dotted lines in FIG. 1. The actuator is also deenergized by operation of the electric control apparatus to receive the atmospheric pressure from the exterior such that the rod 15a is displaced to switch over the switch door 2 from the first position to the second position. When the switch door 2 is located at its first position, a first inlet 1a of air duct 1 is opened to permit the flow of outside air from the exterior into the air duct 1. When the switch door 2 is located at its second position, a second inlet 1b of air duct 1 is opened to permit the flow of inside air recirculated from a passenger compartment 3 of the automobile into the air duct 1.

The air conditioner includes a blower 4 and an evaporator 5 provided respectively within the air duct 1. The blower 4 receives electric power supply from a battery under actuation of an ignition switch such that it is driven to impel the air from the switch door 2 toward the evaporator 5. When the evaporator 5 receives the air from the blower 4, refrigerant medium in the evaporator 5 is evaporated by heat of the air to extract heat from the air. The heat-extracted or cooled air is applied by evaporator 5 to an air-blend door 7, whereas the evaporated refrigerant medium is circulated into a refrigerant compressor 5a. The compressor 5a includes an electromagnetic clutch 5b which is coupled to the automobile engine. The clutch 5b receives the electric power supply from the battery under actuation of the ignition switch such that it is energized to connect the compressor 5a with the engine. When the compressor 5a is driven by the engine, the refrigerant medium from evaporator 5 is compressed by the compressor 5a into high-pressurized one and is condensed by a condenser.

The condensed refrigerant medium from the condenser is changed by an expansion valve into low-pressurized refrigerant medium with low temperature to be recirculated into the evaporator 5.

The air-blend door 7 is provided within the air duct 1 and coupled to a door position adjuster 8 by a rod 8a. The door position adjuster 8 is provided within the passenger compartment 3 and manually manipulated to displace the rod 8a so as to select an opening angle of air-blend door 7 in a desired value. Thus, the cooled air from evaporator 5 is partly applied to and warmed by a heater 6 in accordance with the opening angle of air-blend door 7 and flows into the passenger compartment 3, and the remainder of the cooled air flows directly into the compartment 3. This means that the proportion of the warmed and cooled air is adjusted by the air-blend door 7 to maintain temperature of air in the compartment 3 in a desired value. When the air-blend door 7 is located at its fully closed position, all the cooled air from evaporator 5 directly flows into the compartment 3. This means that the maximum cooling ability of the air conditioner is utilized to condition the air in the compartment 3. In this embodiment, the maximum cooling ability of the air conditioner is defined as lack of surplus cooling ability of the air conditioner. When the air-blend door 7 is located at its fully opened position, all the cooled air from evaporator 5 is warmed by the heater 6 and supplied into the compartment 3 as the warmed air. This means that the surplus cooling ability of the air conditioner becomes the maximum value. In addition, the heater 6 receives heat energy of water in an engine coolant system to warm the cooled air from evaporator 5.

The electric control apparatus comprises an analog-to-digital or A-D converter 12 connected to a seat switch 9a and various sensors 9b, 9c, 10a, 10b, 10c. The seat switch 9a is of a normally open type and provided within a passenger seat in the compartment 3. When total weight of passengers on the passenger seat exceeds a predetermined weight corresponding with the total weight of three average passengers, the seat switch 9a is closed to produce an electric signal therefrom. In the embodiment, the predetermined weight is experimentally presumed as a physical value corresponding with an amount of heat energy discharged from the three passengers. The gas sensor 9b is provided in the compartment 3 to detect an actual concentration of carbon dioxide or $CO_2$ included in the inside air so as to produce an electric signal indicative of the actual concentration of carbon dioxide. The humidity sensor 9c is also provided in the compartment 3 to detect an actual amount of humidity in the inside air so as to produce an electric signal indicative of the actual amount of humidity.

The door position sensor 10a is a potentiometer coupled to the rod 8a of door position adjuster 8. The potentiometer detects a displacement of rod 8a to produce an electric signal indicative of the selected opening angle of air-blend door 7. The gas sensor 10b is provided on a body structure of the automobile to detect an actual concentration of noxious gases included in the outside air, the sensor 10b producing an electric signal indicative of the actual concentration of noxious gases. The dust sensor 10c is also provided on the body structure of the automobile to detect an actual amount of dust included in the outside air, the sensor 10b producing an electric signal indicative of the actual amount of dust. The A-D converter 12 serves to convert the electric signals from sensors 9b, 9c, 10a, 10b, 10c into electric binary signals respectively.

The electric control apparatus also comprises a digital computer 13 connected to first and second door switches 11a, 11b and the A-D converter 12. Each of the binary signals from A-D converter 12 is applied to the computer 13 when required by the computer 13. Each of the door switches 11a, 11b is in the form of a manually operable switch which is provided in the compartment 3. The first and second door switches 11a, 11b are manually actuated to produce electric signals for requiring openings of the first and second inlets 1a, 1b, respectively. The digital computer 13 is a single chip LSI microcomputer and serves to receive a constant voltage of five volts from a voltage stabilizer so as to be ready for its operation. The voltage stabilizer receives the electric power supply from the battery under actuation of the ignition switch to produce the constant voltage therefrom. When the ignition switch is returned to isolate the computer 13 from the voltage stabilizer, inoperativeness of the computer 13 is conducted such that the actuator 15 is deenergized to condition the switch door 2 in the second position.

The computer 13 comprises a central processing unit or CPU which is connected to an input-output device or I/O through a bus line 13a. CPU is also connected through the bus line 13a to a timer, a clock circuit 13b, a read only memory or ROM, and a random access memory or RAM. I/O receives the electric signals from the switches 9a, 11a, 11b and A-D converter 12 to store them in RAM temporarily. These stored signals are selectively read out from RAM and applied to CPU through the bus line 13a. CPU serves to execute a predetermined computer program in accordance with clock signals from clock circuit 13b. The clock circuit 13b is cooperable with a crystal oscillator 14 to produce the clock signals at a predetermined frequency. The timer in computer 13 serves to set data T therein as a value "1" or a value indicative of fifteen minutes under control by CPU.

The predetermined program is previously stored in ROM to be executed in the computer 13 as in the followings.

(1) Reading out the electric signal for requiring the opening of the second inlet 1b from RAM, CPU discriminates the fact that the second door switch 11b is closed and produces a second output signal for conducting deenergization of the actuator 15.

(2) Reading out the electric signal for requiring the opening of the first inlet 1a from RAM, CPU discriminates the fact that the first door switch 11a is closed and produces a first output signal for conducting energization of the actuator 15.

(3) CPU discriminates whether or not the selected door opening angle of the binary signal from RAM is different from a reference angle defined by a fully closed position of the air-blend door 7 in which the cooled air from evaporator 5 is fully blocked from the heater 6. When the selected door opening angle accords the reference angle, CPU produces the second output signal therefrom. The reference angle is previously stored in ROM.

(4) CPU discriminates whether or not the actual amount of dust of the binary signal from RAM exceeds a first predetermined value. When the actual amount of dust exceeds the first predetermined value, CPU produces the second output signal therefrom. The first predetermined value is experimentally obtained and stored in ROM previously.

(5) CPU discriminates whether or not the actual concentration of noxious gases of the binary signal from RAM exceeds a second predetermined value. When the actual concentration of noxious gases exceeds the second predetermined value, CPU produces the second output signal therefrom. The second predetermined value is experimentally obtained and stored in ROM previously.

(6) After producing the second output signal, CPU serves to set data T of the timer as the value indicative of fifteen minutes.

(7) CPU discriminates whether or not the actual concentration of carbon dioxide of the binary signal from RAM exceeds a third predetermined value. When the actual concentration of carbon dioxide exceeds the third predetermined value, CPU produces the first output signal therefrom. The third predetermined value is experimentally obtained and stored in ROM previously.

(8) CPU discriminates whether or not total weight of passengers on the passenger seat exceeds the predetermined weight. Then, CPU produces the first output signal therefrom on a basis of the stored electric signal corresponding with closure of seat switch 9a. The predetermined weight is previously stored in ROM.

(9) CPU discriminates whether or not the actual amount of humidity of the binary signal from RAM exceeds a fourth predetermined value. When the actual amount of humidity exceeds the fourth predetermined value, CPU produces the first output signal therefrom. The fourth predetermined value is experimentally obtained and stored in ROM previously. Each of the executions at the items (7) to (9) is conducted after the executions at the items (3) to (5).

(10) After producing the first output signal, CPU serves to set data T of the timer as the number "1". CPU also subtracts the number "1" from the value set in the timer when the actual amount of humidity is below the fourth predetermined value. In practice of the present invention, a microcomputer of 8048 type manufactured by INTEL CORP. has been used as the computer 13 due to its commercial availability. Detail description regarding the microcomputer is eliminated because the particular construction and programming process are well known in prior arts. An indicator 16 serves to indicate opening of the first inlet 1a in response to the first output signal from CPU through I/O. The indicator 16 also indicates opening of the second inlet 1b in response to the second output signal from CPU.

Hereinafter, operational modes of the above embodiment will be described in detail with reference to a flow diagram shown in FIG. 2. While the ignition switch is not yet actuated, the computer 13 is isolated from the voltage stabilizer and maintained inoperative. At this stage, the actuator 15 is deenergized to receive the atmospheric pressure from the exterior so as to hold the rod 15a in its upward stroke end. Thus, the switch door 2 is maintained in the second position to open the second inlet 1b of air duct 1.

When the ignition switch is actuated to start the engine, the blower 4 is driven by the electric power supply from the battery to induce inside air from the passenger compartment 3 through the second inlet 1b and impel the same toward the evaporator 5. Simultaneously, the clutch 5b is energized by the electric power supply from the battery so that the compressor 5a is activated to compress refrigerant medium from the evaporator 5. The voltage stabilizer also receives the electric power supply from the battery to produce the constant voltage therefrom, and the computer 13 is conditioned in its operation upon receiving the constant voltage from the stabilizer. Then, execution in the computer 13 is initiated at a point 101 according to the flow diagram. At this stage, data T is set as an initial value "1" in the timer of computer 13, the program proceeding to a point 102.

When the gas and humidity sensors 9b, 9c detect an actual concentration of carbon dioxide in the inside air and an actual amount of humidity in the inside air respectively, they produce electric signals respectively indicative of the actual concentration of carbon dioxide and the actual amount of humidity therefrom. When the gas and dust sensors 10b, 10c detect an actual concentration of noxious gases in the outside air and an actual amount of dust outside the automobile respectively, they produce electric signals respectively indicative of the actual concentration of noxious gases and the actual amount of dust. When the door position adjuster 8 is manipulated to select an opening angle of the air-blend door 7 in a desired value, the opening angle of door 7 is detected by the door position sensor 10a and produced as an electric signal indicative of the selected door opening angle. The electric signals from sensors 9b, 9c, 10a, 10b, 10c are then converted by the A-D converter 12 into electric binary signals respectively. Subsequently, these binary signals are applied to and memorized in RAM of computer 13. In addition, assuming that the seat and door switches 9a, 11a, 11b are respectively opened at this stage, they do not produce any electric signals therefrom.

When the computer program proceeds to a point 103, CPU discriminates whether the second door switch 11b is closed or not. Then, CPU discriminates as "no" from the above description and proceeds the program to a point 104. At point 104, CPU also discriminates as "no" from the above description and proceeds the program to the following point 105. Then, the selected opening angle and reference angle of air-blend door 7 are respectively read out from RAM and ROM, and CPU discriminates whether or not the air-blend door 7 is located at its fully closed position. If the selected door opening angle is different from the reference angle, this means that surplus cooling ability of the air conditioner is remained, and CPU discriminates as "no". When the program proceeds to a point 106, the actual amount of dust and first predetermined value are respectively read out from RAM and ROM, and CPU discriminates whether or not the actual amount of dust exceeds the first predetermined value. If the actual amount of dust is below the first predetermined value, CPU discriminates as "no" and proceeds the program to a point 107. Then, the actual concentration of noxious gases and second predetermined value are respectively read out from RAM and ROM, and CPU discriminates whether or not the actual concentration of noxious gases exceeds the second predetermined value. If the actual concentration of noxious gases is below the second predetermined value, CPU discriminates as "no" and proceeds the program to a point 108.

When the program proceeds to point 108, as previously described, the actual concentration of carbon dioxide and third predetermined value are respectively read out from RAM and ROM, and CPU discriminates whether or not the actual concentration of carbon dioxide exceeds the third predetermined value. If the actual concentration of carbon dioxide is below the third predetermined value, CPU discriminates as "no" and proceeds the program to a point 109. Then, CPU discriminates as "no" because the seat switch 9a is opened, the program proceeding to a point 110. At point 110, the actual amount of humidity and fourth predetermined value are respectively read out from RAM and ROM, and CPU discriminates whether or not the actual amount of humidity exceeds the fourth predetermined value. If the actual amount of humidity is below the fourth predetermined value, CPU discriminates as "no" and proceeds the program to a point 111. Then, the number "1" is subtracted from the initial value of data T by CPU and obtained newly as data T indicative of zero. Then, CPU discriminates as "yes" at a point 112 on a basis of the data T indicative of zero, the program proceeding to a point 116.

When the computer program proceeds to point 116, as previously described, CPU produces a first output signal therefrom which is applied to the actuator 15 and indicator 16 through I/O. Then, the indicator 16 indicates opening of the first inlet 1a of air duct 1 in response to the first output signal from computer 13. The actuator 15 is also energized in response to the first output signal from computer 13 to displace the rod 15a downwardly. Thus, the switch door 2 is switched over from the second position to the first position to allow the flow of outside air from the exterior into the air duct 1. Thereafter, at a point 117 data T is set as a value "1" in the timer, the computer program then returning to point 101 through a final point 113. Thereafter, the above-noted execution in computer 13 is repeated at a time interval of hundreds of miliseconds to maintain the opening condition of the first inlet 1a.

In case the actual concentration of noxious gases outside the automobile is increased under the above-noted operational mode to exceed the second predetermined value, it is detected by the gas sensor 10b as an electric signal and converted by the A-D converter 12 into a binary signal indicative of the increased concentration of noxious gases. Then, the binary signal indicative of the increased concentration of noxious gases from converter 12 is applied to the computer 13 and memorized in RAM at point 102. When the program proceeds to point 107, CPU discriminates as "yes" on a basis of the above description and proceeds the program to a point 114. Then, CPU produces a second output signal therefrom which is applied to the actuator 15 and indicator 16 through I/O.

When the second output signal from computer 13 is applied to the actuator 15 and indicator 16, as previously described, the indicator 16 indicates opening of the second inlet 1b of air duct 1, and the actuator 15 is also deenergized to displace the rod 15a upwardly. Thus, the switch door 2 is switched over from the first position to the second position to allow the flow of inside air from the compartment 3 into the air duct 1. Thereafter, at a point 115 data T is set as a value indicative of fifteen minutes in the timer, the program returning to point 101 through point 113. Thereafter, the above-noted execution in computer 13 is repeated at the time interval of hundreds of miliseconds to maintain the opening condition of the second inlet 1b until the increased concentration of noxious gases decreases below the second predetermined value.

In case the actual amount of dust outside the automobile is increased under the above-noted operational mode to exceed the first predetermined value, it is detected by the dust sensor 10c as an electric signal and converted by the A-D converter 12 into a binary signal indicative of the increased amount of dust. Then, the binary signal indicative of the increased amount of dust from converter 12 is applied to the computer 13 and memorized in RAM at point 102. When the program proceeds to point 106, CPU discriminates as "yes" on a basis of the above description and proceeds the program to point 114. Then, the indicator 16 indicates opening of the second inlet 1b in response to a second output signal from computer 13, as previously described. The actuator 15 is also deenergized in response to the second output signal from computer 13 so that the switch door 2 is switched over from the first position to the second position to allow the flow of inside air into the air duct 1, as previously described. Subsequantly, at point 115 data T is set as a value indicative of fifteen minutes in the timer, the program returning to point 101. Thereafter, the above-noted execution in computer 13 is repeated to maintain the opening of the second inlet 1b until the increased amount of dust decreases below the first predetermined value.

In case the door position adjuster 8 is again manipulated under the above-noted operational mode to select the opening angle of air-blend door 7 in the reference angle, the selected door opening angle is detected by the door position sensor 10a as an electric signal and converted by the A-D converter 12 into a binary signal indicative of the selected door opening angle. Then, the binary signal indicative of the selected door opening angle is applied to the computer 13 and memorized in RAM at point 102. When the program proceeds to point 105, CPU discriminates as "yes" on a basis of the above description. This means lack of surplus cooling ability of the air conditioner.

When the program proceeds to point 114, the indicator 16 indicates opening of the second inlet 1b in response to a second output signal from computer 13, as previously described. The actuator 15 is also deenergized in response to the second output signal from computer 13 so that the switch door 2 is switched over to allow the flow of inside air into the air duct 1, as previously described. Then, at point 115 data T is set as a value indicative of fifteen minutes in the timer, the program returning to point 101. Thereafter, the above-noted execution in computer 13 is repeated to maintain the opening condition of the second inlet 1b until the door position adjuster 8 is again adjusted to condition the selected opening angle of air-blend door 7 in a value different from the reference angle.

In case at this stage the opening angle of door 7 is selected by the adjuster 8 as a value different from the reference angle, the selected door opening angle is stored at point 102 in RAM as a binary signal, as previously described. Then, CPU discriminates at "no" at point 105 on a basis of the above description, the program returning to point 101 through points 106, 114. In case at this stage the increased amount of dust decreases below the first predetermined value, the decreased amount of dust is stored at point 102 in RAM as a binary signal, as previously described. Then, CPU discriminates as "no" at point 106 on a basis of the above description, the program returning to point 101 through points 107, 114. In case at this stage the increased concentration of noxious gases decreases below the second predetermined value, the decreased concentration of noxious gases is stored at point 102 in RAM as a binary signal, as previously described. Then, CPU discriminates as "no" at point 107 on a basis of the above description, the program proceeding to point 108.

In case each of the discrimination results at points 108 to 110 is "no", as previously described, after the proceeding of computer 13 from point 107 to point 108, the number "1" is subtracted from the value indicative of fifteen minutes at point 111 and obtained newly as data T indicative of the subtraction resultant value, the program proceeding to point 112. Then, CPU discriminates as "no" because the data T does not become zero, the program returning to point 101 through point 113. Thereafter, the above-noted execution from point 101 to point 113 through point 111 is repeated until the subtraction resultant value obtained repetitively at point 111 becomes zero with lapse of fifteen minutes.

In case the actual amount of humidity in the inside air is increased to exceed the fourth predetermined value before the lapse of fifteen minutes, the increased amount of humidity is stored at point 102 in RAM as a binary signal, as previously described. Then, CPU descriminates as "yes" at point 110 on a basis of the above description and proceeds the program to point 116. Thus, the indicator 16 indicates opening of the first inlet 1a in response to a first output signal from computer 13, and the actuator 15 is also energized in response to the first output signal so that the switch door 2 is switched over to allow the flow of outside air from the exterior into the air duct 1, as previously described. Thereafter, a value "1" is newly set in the timer at point 117, and the computer program returns to point 101 through point 113.

In case the number of passengers on the passenger seat exceeds three before the lapse of fifteen minutes, total weight of the passengers is increased to exceed the predetermined weight. Then, the increased total weight of the passengers is stored at point 102 as a binary signal, as previously described. Thereafter, CPU discriminates as "yes" at point 109 on a basis of the above description and proceeds the program to point 116. Thus, the indicator 16 indicates opening of the first inlet 1a, and the switch door 2 is also switched over due to energization of actuator 15 to allow the flow of outside air from the exterior into the air duct 1, as previously described. Thereafter, a value "1" is newly set in the timer at point 117, and the program returns to point 101 through point 113.

In case the actual concentration of carbon dioxide in the inside air is increased to exceed the third predetermined value before the lapse of fifteen minutes, the increased concentration of carbon dioxide is stored at point 102 in RAM as a binary signal, as previously described. Then, CPU discriminates as "yes" at point 108 on a basis of the above description and proceeds the program to point 116. Thus, the indicator 16 indicates opening of the first inlet 1a, and the switch door 2 is also switched over due to energization of the actuator 15 to allow the flow of outside air from the exterior into the air duct 1, as previously described. Thereafter, a value "1" is newly set in the timer at point 117, the program returning to point 101 through point 113.

In case data T indicative of the subtraction resultant value obtained repetitively at the above-noted point 111 decreases down to zero with the lapse of fifteen minutes, CPU discriminates as "yes" at point 112 and proceeds the program to point 116. Thus, the indicator 16 indicates opening of the first inlet 1a, and the switch door 2 is also switched over due to energization of actuator 15 to allow the flow of outside air from the exterior into the air duct 1, as previously described. Thereafter, a value "1" is set in the timer at point 117, the program returning to point 101 through point 113.

In case each of discrimination results at points 108 to 110 is "yes" at this stage, the computer program proceeds to point 116 from one of points 108 to 110 and returns to point 101 through points 117, 113, as previously described.

In case at each of ponts 105 to 107 CPU discriminates as "yes", as previously described, under each of the discrimination results as "yes" at points 108, 109, 110, 112, it proceeds the program to point 114 to produce a second output signal therefrom. Thus, the indicator 16 indicates opening of the second inlet 1b, and the switch door 2 is also switched over due to deenergization of actuator 15 to allow the flow of inside air from the compartment 3 into the air duct 1. When the program proceeds to point 115, a value indicative of fifteen minutes is set in the timer, the program returning to point 107 through point 113.

In case the first door switch 11a is closed during the above-noted various executions, it produces an electric signal therefrom which is applied to the computer 13 and stored in RAM at point 102. When the program proceeds to point 104, CPU discriminates as "yes" and proceeds the program to point 116. Thus, the indicator 16 indicates opening of the first inlet 1a, and the switch door 2 is switched over due to energization of the actuator 15 to allow the flow of outside air from the exterior into the air duct 1, as previously described, the program proceeding to points 117, 113. Thereafter, the execution from point 101 to point 113 through points 104, 116 is repeated to maintain the opening condition of the first inlet 1a.

In case the second door switch 11b is closed during the above-noted various executions, it produces an electric signal therefrom which is applied to the computer 13 and stored in RAM at point 102. When the program proceeds to point 103, CPU discriminates as "yes" and proceeds the program to point 114. Thus, the indicator 16 indicates opening of the second inlet 1b, and the switch door 2 is switched over due to deenergization of the actuator 15 to allow the flow of inside air from the compartment 3 into the air duct 1, as previously described, the program proceeding to points 115, 113. Thereafter, the execution from point 101 to point 113 through points 103, 114 is repeated to maintain the opening condition of the second inlet 1b.

Although in the above embodiment the digital computer 13 is adapted to control the actuator 15, it may be replaced with an electronic circuit which has the same function as that of the computer 13 to control the actuator 15.

While in the above embodiment the gas sensors 9b, 10b are respectively provided in the compartment 3 and on the body structure of the automobile, they may be also replaced with another gas sensor which is provided downstream of the switch door 2 within the air duct 1 to selectively detect concentrations of carbon dioxide in the inside air and noxious gases in the outside air. In this case, the predetermined program should be modified such that CPU may discriminate at points 114, 116 as to whether another gas sensor detects the concentration of carbon dioxide in the inside air or the concentration of noxious gases in the outside air.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control apparatus for an automobile air conditioner including an air duct provided with a first inlet for inducting outside air from the exterior into a passenger compartment through said air duct and with a second inlet for recirculating inside air from the passenger compartment into said air duct, a switch door arranged within said air duct for conducting the induction of outside air in its first position and the recirculation of inside air in its second position, and an actuator arranged to switch over said switch door from the first position to the second position in its first operative condition and to switch over said switch door to the first position from the second position in its second operative condition, said control apparatus comprising:
- first means for detecting undesired outside air conditions and producing a first electric signal indicative of the undesired outside air conditions;
- second means for detecting undesired inside air conditions and producing a second electric signal indicative of the undesired inside air conditions; and
- third means for generating a first output signal therefrom when a value of said first electric signal exceeds a first predetermined value such that said actuator is rendered in response to said first output signal in the first operative condition and for generating a second output signal therefrom with lapse of a predetermined period of time after the value of said first electric signal becomes below the first predetermined value such that said actuator is rendered in response to said second output signal in the second operative condition and for conducting the generation of said second output signal when a value of said second electric signal exceeds a second predetermined value during the predetermined period of time.

2. An electric control apparatus as claimed in claim 1, wherein said first means includes a gas sensor for detecting an actual concentration of noxious gases in the outside air and producing an electric signal indicative of the actual concentration of noxious gases; and a dust sensor for detecting an actual amount of dust in the outside air and producing an electric signal indicative of the actual amount of dust; and wherein said third means is arranged to conduct the generation of said first output signal when one of values of said electric signals exceeds a predetermined noxious concentration or a predetermined dust amount and to conduct the generation of said second output signal with lapse of the predetermined period of time after both the values of said electric signals become below the predetermined noxious concentration and dust amount.

3. An electric control apparatus as claimed in claim 1, wherein said second means includes a gas sensor for detecting an actual concentration of carbon dioxide in the inside air and producing and electric signal indicative of the actual concentration of carbon dioxide and a humidity sensor for detecting an actual amount of humidity in the inside air and producing an electric signal indicative of the actual amount of humidity; and wherein said third means is arranged to conduct the generation of said second output signal when one of values of said electric signals exceeds a predetermined carbon dioxide concentration or a predetermined humidity amount during the predetermined period of time.

4. An electric control apparatus as claimed in claim 1, wherein said third means includes a timer circuit for defining the predetermined period of time after the value of said first electric signal becomes below the first predetermined value.

5. A method for controlling an automobile air conditioner including an air duct provided with a first inlet for inducting outside air from the exterior into a passenger compartment through said air duct and with a second inlet for recirculating inside air from the passenger compartment into said air duct, a switch door arranged within said air duct for conducting the induction of outside air in its first position and the recirculation of inside air in its second position, and an actuator arranged to switch over said switch door from the first position to the second position in its first operative condition and to switch over said switch door to the first position from the second position in its second operative condition, said method comprising the steps of:
- detecting undesired outside air conditions to produce a first electric signal indicative of the undesired outside air conditions;
- detecting undesired inside air conditions to produce a second electric signal indicative of the undesired inside air condtions;
- discriminating whether or not a value of said first electric signal exceeds a first predetermined value;
- generating a first output signal when the value of said first electric signal exceeds the first predetermined value such that said actuator is rendered in response to said first output signal in the first operative condition;
- generating a second output signal with lapse of a predetermined period of time after the value of said first electric signal becomes below the first predetermined value such that said actuator is rendered in response to said second output signal in the second operative condition;
- discriminating whether or not a value of said second electric signal exceeds a second predetermined value during the predetermined period of time; and
- conducting the generation of said second output signal when the value of said second electric signal exceeds the second predetermined value during the predetermined period of time.

* * * * *